Oct. 9, 1951     K. G. ANDERSON     2,570,744

TROUGH FOR MOTOR VEHICLE VENTILATING WINDOWS

Filed Feb. 18, 1950

INVENTOR.
Kador George Anderson
BY
Soans, Pond & Anderson
Attys.

Patented Oct. 9, 1951

2,570,744

UNITED STATES PATENT OFFICE 2,570,744

TROUGH FOR MOTOR VEHICLE VENTILATING WINDOWS

Kador George Anderson, Chicago, Ill.

Application February 18, 1950, Serial No. 145,070

5 Claims. (Cl. 296—44)

The present invention relates to an automobile accessory, and more particularly it relates to a novel trough which is readily adaptable for attachment to a ventilating window of a motor vehicle for the purpose of preventing rain from draining into the interior of the vehicle.

Many, if not most, of the automobiles on the roads today include ventilating windows which are usually generally triangularly shaped and are pivotally supported in a manner such that they may be adjusted transversely of the direction of travel of the automobile. These windows are provided for the purpose of circulating air through the interior of the vehicle with a minimum amount of draft and discomfort to the occupants. In addition to providing fresh air, the ventilating windows are operative to automatically remove condensate or frost from the inside of the windshield of the vehicle without necessitating interfering with driving of the automobile.

These features of the ventilating windows are particularly advantageous in rainy weather when the car becomes stuffy, and the accompanying high humidity causes the windshield to mist or fog, resulting in unsafe driving conditions. However, in the past, when the ventilating windows were open, while it was raining, the windows drained into the interior of the automobile. This difficulty is even more troublesome in the case of ventilating windows which cant downwardly toward the interior of the automobile when opened. As a result of these characteristics of ventilating windows in rainy weather, the windows have not been opened by most persons at the time when circulation was most needed to provide maximum driving safety and comfort to the occupants of the automobile.

Various arrangements have been devised for the purpose of draining the water from the ventilating windows so that they may be opened when driving in the rain. These arrangements have been generally unsatisfactory and have often caused increased amounts of water to be carried into the car with a corresponding increase in discomfort to the occupants. Those arrangements which did provide somewhat satisfactory drainage from the window inherently carried the drained water back into the automobile along the under side of the drain, particularly when the windows canted downwardly.

In addition, the arrangements known heretofore for draining ventilating windows have been generally unsightly so that they did not blend with the smooth lines of present day automobiles, and these previously known arrangements have been difficult to attach to the vehicle. As a result, they have been seldom used on present day automobiles.

Accordingly, the principal object of the present invention is to provide an improved device for draining water from the usual ventilating windows of motor vehicles.

A further object of the invention is to provide a trough which will positively remove water drained from an automobile ventilating window of the type described without any of the water being introduced into the automobile.

Another object of the invention is the provision of a device for draining ventilating windows of automobiles which will be unobtrusive and which will conform to the smooth lines of the automobile to which it is attached.

Further objects include provision of means for positively and quickly attaching the trough to the automobile and provision of a draining device constructed so as to permit connection of such attaching means thereto without impairing the appearance of the device.

Additional objects and advantages of the invention will become apparent with reference to the accompanying drawings and subsequent description.

Figure 1:
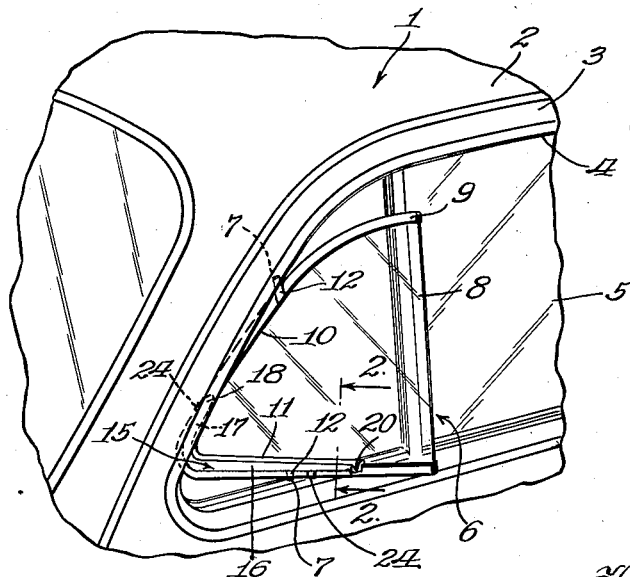
Fig. 1 is a fragmentary perspective view of an automobile showing a ventilating window set for circulating air through the vehicle and having a trough, fabricated in accordance with the invention, attached thereto.

As previously pointed out, the invention relates to a trough device which is usually associated with an automobile, and accordingly, the trough device is shown in the drawings attached to a conventional automobile, a section of which is shown at 1 in Fig. 1. The automobile comprises the usual body 2 which hingedly supports a door 3 in a conventional manner.

The door 3 is provided with an opening 4 in the upper portion which is closed off by a vertically movable window 5 and a ventilating or wing window 6 which is disposed forwardly of the window 5.

The ventilating window 6 is generally triangular in shape as shown in Fig. 1 in order that the window conform to the shape of the door 3 which is, in turn, fabricated to follow the general lines of the automobile 1. The ventilating window 6 is pivotally supported upon a pair of vertically spaced, oppositely disposed pins 7 which are attached to the door 3 and may be moved transversely of the door 3 to provide the desired ventilating action. Suitable means (not shown) are provided for opening and closing the window 6.

Figure 2:
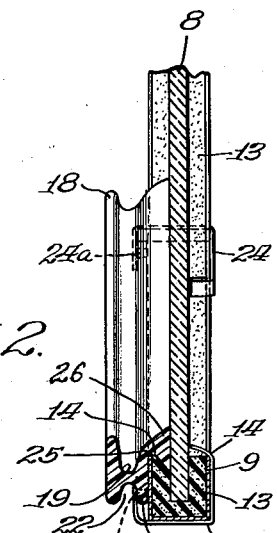
Fig. 2 is a view taken along line 2—2 in Fig. 1.

The ventilating window 6 comprises a generally triangularly shaped piece of transparent material 8, usually "shatter-proof" type glass, which is set in a generally V-shaped channel section or frame member 9, the leading edge 10 and base edge 11 of the glass 8 being set in the channel section 9. The channel section 9 is provided with recesses 12 which are positioned and proportioned to receive the pins 7. In order to prevent rattling and cracking of the glass 8 in the channel section 9, a piece of fabric or resilient material 13 is inserted intermediate the channel section 9 and glass 8. This construction of the ventilating window 6 provides a ridge or shoulder 14 along the base and leading edges and on each side of the glass 8 (Fig. 2).

When the ventilating window 6 is opened, it pivots on the pins 7 to provide openings forwardly and rearwardly of the window 6 and pins 7. The effect of this, when the automobile is travelling on the road, is to admit fresh air through the forward opening and exhaust spent or foul air through the rearward opening. This, of course, causes circulation within the vehicle and results in the automatic removal of condensed moisture from the inside face of the windshield. However, during rainy weather water on the forward face of the ventilating window 6, when opened, drains from the window into the automobile due to the inward flow of air and the fact that the forward end extends into the interior of the automobile (Fig. 2). The extent of this drainage is increased when the ventilating window cants downwardly into the interior of the automobile as is the case with several types of automobiles now being operated.

The present invention provides novel means for draining this water from the ventilating window 6 and from the interior of the automobile into which the window extends when opened. The drain means comprises a trough designated generally as 15 which is preferably fabricated from a relatively hard plastic material, but may be fabricated from other types of material. The trough 15 is shaped to conform to the angle defined by the V-shaped channel member 9 and comprises a generally horizontally extending base section 16 which connects to and is preferably integral with an upwardly and rearwardly extending head section 17. The upper end of the head section is pointed, as shown at 18, so that the trough 15 collects all of the water drained from the window 6. The base section 16 is proportioned so as to extend beyond the pivot pin 7 associated with the channel section 9, preferably to a point adjacent the rearward edge of the window 6.

The trough 15 is, of course, provided with a groove 19 which extends generally longitudinally of the base and head sections 16 and 17, draining water from the trailing end of the trough 15. The groove opens away from the channel section 9 and the bottom of the groove 19 in the base section 16 declines downwardly from the head section 17 to provide sufficient fall to insure removal of the water. In this connection, the pitch of the groove 19 is proportioned so that the drained water falls independently of the canting of the ventilating window 6.

The groove 19 at the trailing or rearward end of the base section 16 curves outwardly, away from the plane of the window 6, and terminates in a downwardly turned lip 20 which is formed in the material from which the trough 15 is made. As a result of this construction of the groove 19, the water drops from the lip 20 in such a manner as to reduce the amount of water which travels along the underside of the trough 15.

Figure 3:
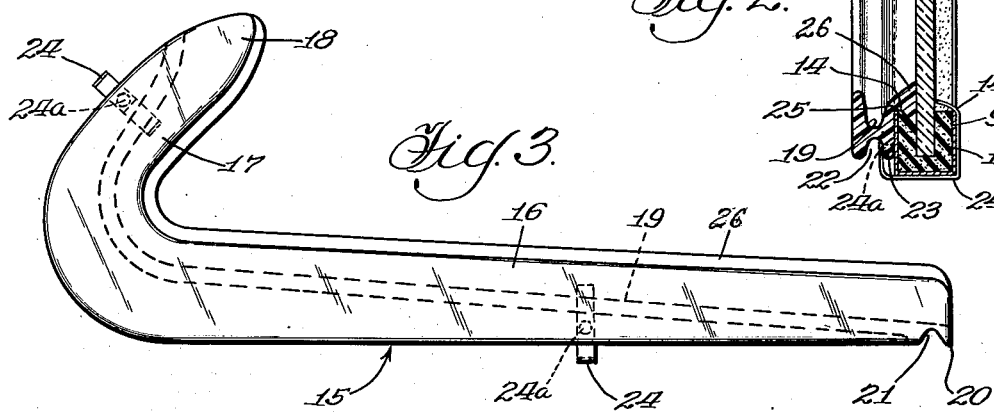
Fig. 3 is an enlarged side view of the improved trough.
Figure 4:
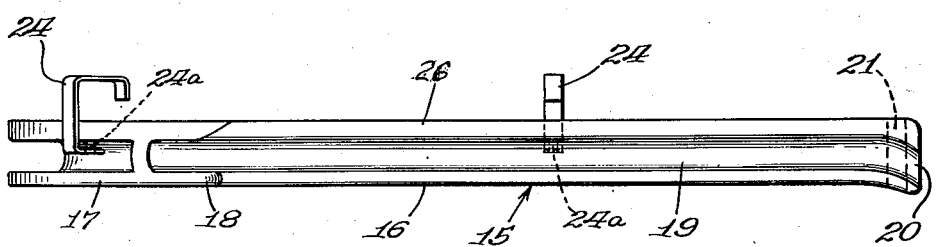
Fig. 4 is a plan view of the trough device shown in the previous figures.

However, despite the provision of the lip 20, it has been found that if suitable means are not provided, water which drops from the lip 20 travels along the underside of the trough 15 and enters the automobile. The exact nature of this phenomenon is not clearly understood. In order to prevent this action of the water, two additional features are provided. First, a cross drip or groove is formed in the underside of the trough 15, preferably closely adjacent the trailing end of the trough 15, as is shown particularly at 21 in Figs. 3 and 4. The cross drip 21 extends transversely of the trough 15 and is proportioned so as to prevent flow of water along the underside of the trough 15. The cross drip 21 is preferably generally semi-circular in cross-section, having a depth and width of about one fourth (¼) of an inch.

The second feature which has been provided in addition to the lip 20, to prevent the flow of water into the automobile 1 is to form a channel 22 in the underside of the trough 15. As shown in the drawings, the channel extends from a point forwardly of the cross-drip 21 to a point closely adjacent the upper end 18 of the head section 17. The channel 22 opens toward the channel section 9, being directed oppositely to the groove 19, as illustrated in Fig. 2. It has been found that through this construction flow of the water along the underside of the trough 15 into the vehicle 1 is substantially eliminated and when this feature is combined with the cross drip 21, no water enters the automobile along the bottom of the trough 15.

The channel 22 serves a further function in providing a section 23 for connecting attaching means to the trough 15 without impairing the appearance of the trough. In the illustrated construction, the attaching means comprises a strip 24 fabricated from spring steel or the like and bent to form a channel proportioned to fit around the ventilating window 6. One end of the strip is rigidly connected to the section 23 of the trough 15 as by rivets 24a or the like and the other end is bent inwardly toward the glass 8 to connect to the inner shoulder 14 of the ventilating window 6 (Fig. 2). The strip 24 may be eliminated if the trough 15 is glued to the window 6.

The trough 15 illustrated in the drawing is further provided with a longitudinally extending inset which provides a ledge 25 proportioned to fit over the outer shoulder 14 formed by the channel section 9. The lower edge of the ledge 25 extends horizontally inwardly toward the glass 8 and then declines toward the window 6 so that the ledge depresses the fabric 13 adjacent the window 8 when the trough is held in position thereby providing a seal and increased area for gluing the trough to the window if desired. The upper edge of the ledge extends generally upwardly toward the window 6 to provide an upwardly concave section 26 which drains into the groove 19.

In the embodiment illustrated, two strips 24 are provided, one being attached to the base section 16, the other being attached to the head section 17. These strips have been adequate to rigidly attach the trough, but it will be understood that additional strips may be provided as needed or other attaching means may be employed.

When the trough 15 is attached to the ventilating window 6, the ledge 25 is seated on the shoulder 14 and the strips 24 are extended under the channel section 9 as shown particularly in Fig. 2.

In the foregoing has been described a novel device which is readily attachable to the ventilating window of an automobile. The device effectively drains all of the water from the window independently of the canting action of such window, and positively prevents any water from flowing into the interior of the automobile. As a result, the ventilating window may be open under all weather conditions without wetting or otherwise causing discomfort to the occupants of the automobile.

The various features of the invention which are believed to be new are set forth in the following claims.

I claim:

1. A trough of the type described comprising an elongated base section and a head section which extends upwardly at one end of said base section, said base section having a longitudinally extending, upwardly open groove formed therein which terminates at the other end of said base section and having a transversely extending, downwardly open groove formed in the underside thereof adjacent said other end of said base section.

2. A trough adapted for attachment to an automobile ventilating window, including an elongated base section and a head section which extends upwardly from one end of said base section, said base section having a longitudinally extending, generally upwardly open groove formed therein and having a downwardly open, transversely extending groove formed in the underside thereof, said upwardly opening groove terminating at the other end of said base section, said transversely extending groove being located closely adjacent said other end of said base section, said base section having a channel formed therein which is oppositely directed from said groove and extends from a point adjacent said transversely extending groove to a point on said head section.

3. An elongated trough adapted for attachment to an automobile ventilating window which comprises a glass and a supporting frame member, said trough having a longitudinally extending groove formed therein which opens away from said frame member and comprising a base section and a head section which extends upwardly from one end of said base section, said base section having a transversely extending, downwardly open groove formed in the underside thereof adjacent the other end of said base section, said trough having a channel formed therein which extends from a point adjacent the upper end of said head section and terminates at said other end of said base section, one side of said trough having an outwardly extending section formed thereon which is adapted to fit over the window frame and abut the glass, the outwardmost portion of said outwardly extending section extending downwardly.

4. An elongated trough adapted for attachment to an automobile ventilating window which comprises a glass and a supporting frame member, said trough having a longitudinally extending groove formed therein which opens away from said frame member and comprising a base section and a head section which extends upwardly from one end of said base section, said groove terminating in a downwardly extending lip at the other end of said base section, said base section having a transversely extending, downwardly open groove formed in the underside thereof closely adjacent said lip, said trough having a channel formed therein which extends from a point adjacent said transversely extending groove to a point adjacent the upper end of said head section.

5. An elongated trough adapted for attachment to an automobile ventilating window which comprises a glass and a supporting frame member extending around the edges of the glass, said trough fitting against a portion of said frame member and having a longitudinally extending groove formed therein which opens away from said frame member, said trough comprising a base section, a head section which extends upwardly and rearwardly from one end of said base section, and attaching means, said groove in said trough terminating in a downwardly extending lip at the other end of said base section, said base section having a transverse, downwardly open groove formed in the underside thereof closely adjacent said lip, said trough having a longitudinal channel formed therein which opens toward said frame member and extends from a point adjacent said transverse groove to a point adjacent the upper end of said head section, said attaching means comprising a strip which extends upwardly into said channel section and means for attaching said strip to said trough, said strip being formed to fit around and connect to said window.

KADOR GEORGE ANDERSON.

REFERENCES CITED

The following references are of record in the file of this patent:

UNITED STATES PATENTS

| Number | Name | Date |
|---|---|---|
| D. 157,991 | Mauck | Apr. 4, 1950 |
| 2,119,635 | Griffith | June 7, 1938 |
| 2,354,443 | Schirra | July 25, 1944 |
| 2,517,205 | Hoag | Aug. 1, 1950 |